United States Patent [19]
Kishton

[11] Patent Number: 4,634,153
[45] Date of Patent: Jan. 6, 1987

[54] REUSABLE HOSE FITTING

[75] Inventor: Donald L. Kishton, Mentor, Ohio

[73] Assignee: Hydrafit, Inc., Cleveland, Ohio

[21] Appl. No.: 772,260

[22] Filed: Sep. 3, 1985

[51] Int. Cl.⁴ .................................. F16L 33/22
[52] U.S. Cl. .................................. 285/255; 285/322
[58] Field of Search ............... 285/255, 249, 149, 322

[56] References Cited
U.S. PATENT DOCUMENTS

| 2,819,099 | 1/1958 | Rittle | 285/159 |
| 2,940,778 | 6/1960 | Kaiser | 285/255 X |
| 3,189,370 | 6/1965 | Marshall | 285/255 X |

FOREIGN PATENT DOCUMENTS 236163 1/1969 U.S.S.R. .................... 285/149

Primary Examiner—Dave W. Arola
Attorney, Agent, or Firm—Peter D. Sachtjen

[57] ABSTRACT

A reusable hose fitting for connecting a hose to an accessory including a nipple fixedly connected at one end to the accessory and having a sleeve removably inserted into the open end of the hose. A removable segmented wedge and a socket subassembly surrounds the hose as is connected to the nipple by axial fasteners, the tightening of which inwardly shifts the segmented wedge to compressively capture the hose. The subassembly is removable for replacement of a damaged hose with removal of the nipple.

5 Claims, 6 Drawing Figures

REUSABLE HOSE FITTING

BACKGROUND

The present invention relates to the field of hose fittings and, in particular, to a reusable fitting for use in fluid conveying lines.

Hose fittings are universally used for connecting the ends of fluid conveying lines to their associated accessories for fluid delivery, control or operation in pneumatic and/or liquid applications and under widely varying chemical environments. Such fittings fall into two general categories, original equipment fittings and reusable fittings. In the former category, the hose, together with the fittings, is assembled as a unit by the manufacturer. Because of the product volume associated therewith, sophisticated and expensive tooling may be used to provide economical manufacturing costs. Through automated stripping and crimping operations, the fitting is integrally assembled to a precut length of tubing to form an assembled unit. Such hose assemblies however, are expensive to maintain in service. Should any of the fluid line components fail, the entire hose line must be replaced, even though only one of the components may be non-functional. Because of the production techniques, the other parts cannot be salvaged and reused. In order to maintain production, a large inventory of such assemblies must be carried by the user to minimize the equipment downtime. These problems have been significantly overcome through the adoption of reusable fittings. Upon failure of the original equipment, a new hose assembly is constructed from hose cut to length from a bulk inventory of hose. Reusable fittings are connected to the ends of the hose line to form the replacement assembly. Thereafter, should any of the components fail in service, only the defective part needs to be replaced. Inasmuch as the predominant failure is at the hose, the reusable fittings constitute an in-service inventory of parts such that only the replacement hose must be carried in inventory leading the economical purchase of bulk hose cut to length on an as-required basis. The fittings are salvaged and reused in the replacement assembly. Significant savings thus result, often up to 70% of the cost of the pre-assembly hose lines. Thus, reusable fittings secure a significant market penetration.

Reusable fittings, however, also have constraints in competing with high quality assembled units. They must provide similar performance thus requiring precision machining and accurate assembly. They also must be readily disassembled, without sacrifice of the fitting, and reassembled with a minimum of equipment shutdown.

Replacement hose lines requir removal of the entire line from the accessories for disassembly of the fittings and the hose. In a conventional reusable fitting, reassembly requires cutting a replacement hose to the desired length and preparing the hose ends by stripping or skivving the outer covering. The fitting includes an external socket which is clamped in a vise and the skived hose end is inserted into one end thereof. A nipple is then screwed into the other end of the socket and the hose to complete the assembly. To avoid distorting the nipple during assembly, a mandrel is oftentimes required. Because the fittings are integral with the hose, adapter fittings are required to avoid twisting of the hose during connection to the accessories to thereby prevent separation of the wall plies with a consequent loss of strength. The requirements of complete disassembly of the fittings for repair, the special tools and need for adaptive connectors increase the time and cost of repair.

Segmented reusable fittings have been used for inline flanged couplings using large diameter, substantially high pressure hoses. Such segmented reusable fittings have advantages in that they reduce end preparation and provide high compressive loadings at the nipple hose interface. However, they are disadvantageous in that complete removal is required for repair. Moreover, the segments must be accurately circumferentially aligned to provide uniform compression of the hose and to prevent distortion of the nipple. This can only be achieved by vertical assembly. Thereafter, by means of an expensive assembly tool, the segments are compressed and a retaining band inserted over the compressed segment and the assembly tool removed. It has been proposed in U.S. Pat. No. 2,880,020 to use wedge-shaped segments and the coupling flange to generate the compressive force on the segments thereby reducing the need for the need for complex assembly tools. However, such a coupling also requires complete disassembly from the line, vertical and manual orientation of the segments and a supplemental drawing plate and bolts which are tightened to slide the flange over the segments to the assembled position. The flange and draw bolts removed and the fitting and hose sub-assembly are then coupled in line at a mating flange.

SUMMARY OF THE INVENTION

The present invention provides a segmented reusable hose fitting overcoming the above limitations and disadvantages with an assembly wherein the nipple may remain in-line during assembly and reassembly of the hose line, such that the assembly may proceed independent of nipple and hose orientation and requires only a single common tool for effecting compression of the segments while providing the high fluid integrity associated with such designs. More particularly, the novel reusable fitting incorporates a nipple which may be universally connected to the accessories without the need for adaptive fittings to prevent rotation and torquing of the hose line. The nipple includes an intermediate enlarged, hexagonal neck for assembling the nipple to the accessory. The collar includes a plurality of circumferentially spaced threaded holes. The segments have an inner surface engageable with the hose and a conical outer surface engageable with a complementary surface on an outer collar. The arrangement is such that upon movement of the socket toward the collar the segments are driven radially inwardly. The segments are circumferentially spaced and retained in sub-assembly with the socket by head set screws which are partially captured in axial slots in the components. The sub-assembly may thus be installed independent of nipple and hose orientation. The ends of the screws are threadedly engageable with the holes. The fitting may be readily assembled or disassembled on site. For initial installation, the nipple is assembled to the accessory coupling with a suitable open end wrench applied to the collar. The hose is then cut to the desired length without further end preparation. The sub-assembly is next telescoped rearwardly over the hose end with the screws maintaining segment alignment. The hose is inserted over the nipple sleeve until engagement with the collar and circumferentially oriented to eliminate any hose twisting. The sub-assembly is shifted into loose position adjacent the collar and each of the screws manually tightened. Thereafter, by means of an Allen head wrench, the screws are fully tightened thereby shifting the collar and inwardly compressing the wedges against the hose to effect sealing engagement with the nipple sleeve. During the tightening, the screws maintain the uniform segment spacing to insure load uniformity. The screws also provide a high mechanical advantage resulting in low manual assembly forces. The other hose end is connected thereafter in a similar manner. Disassembly proceeds in reverse of the above resulting in removal of first the screws and then rearward shifting of the collar exposing the wedges which then may be removed from the hose. The hose may be removed by conventional means. The collar is removed from the hose and re-assembly with the wedges and the screws for subsequent re-installation as described above.

Accordingly, it is an object of the present invention to provide a fluid fitting which may be installed and removed without the need for specialized tools.

Another object of the present invention is to provide a reusable hose fitting which can be installed without torquing the fluid line.

Another object of the present invention is to provide a reusable hose fitting which permits a damaged hose to be replaced without removal of the fitting nipple.

Another object of the present invention is to provide a reusable hose fitting having a permanently installed male ended connector which reduces the need for special adaptor fittings.

A further object of the invention is to provide a reusable hydraulic fitting utilizing radially actuated wedge segments for uniformly compressing a hose against the fitting nipple.

Still another object of the present invention is the provision of a segmented wedge coupling having uniformly circumferentially spaced wedge segments actuated in a manner preventing or overcoming non-circularity of the fluid line in assembly.

Yet another object of the invention is to provide a fluid fitting which may be assembled to the fluid line by ordinary threaded fasteners by a single tool.

Still another object of the invention is the provision of a fluid line coupling which is strong and durable, economical to manufacture and repeatedly installable and removable without destruction of the fitting components.

A still further object of the invention is the provision of a hydraulic fitting which may be installed in the field with personnel of ordinary skills with commonly available tools.

BRIEF DESCRIPTION OF THE DRAWINGS

The above and other objects and advantages of the present invention will become apparent upon reading the following description taken in conjunction with the drawings illustrating a preferred embodiment in which.

DETAILED DESCRIPTION OF THE PREFERRED EMBODIMENT

Figure 1:
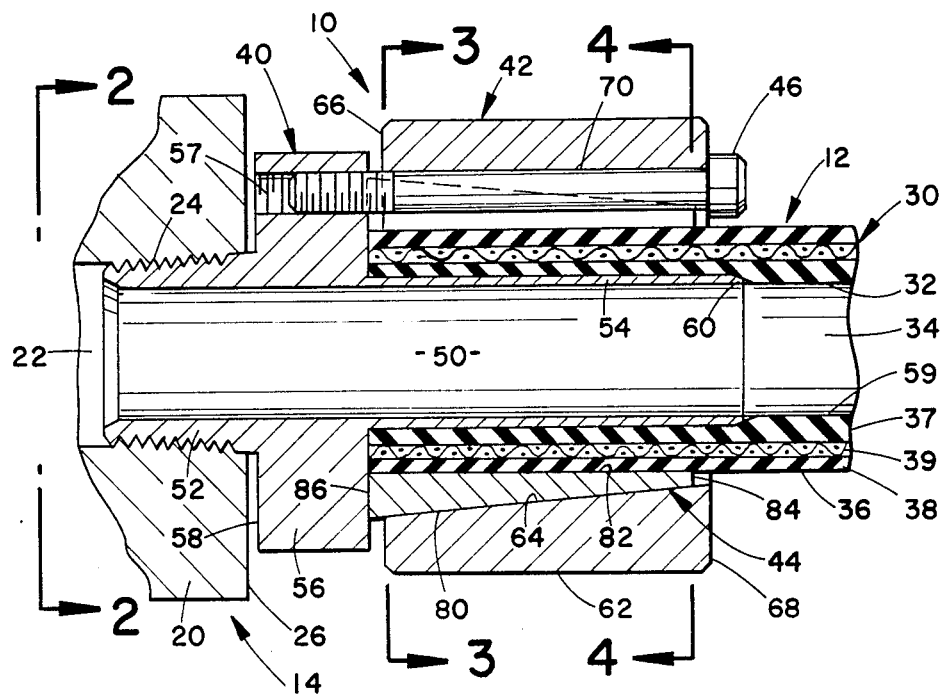
FIG. 1 is a longitudinal cross-sectional view of a reusable hydraulic fitting in accordance with the invention.
Figure 2:
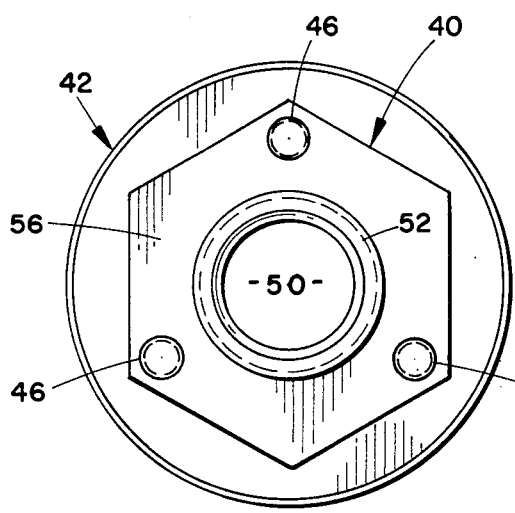
FIG. 2 is a view taken along line 2—2 in FIG. 1.
Figure 3:
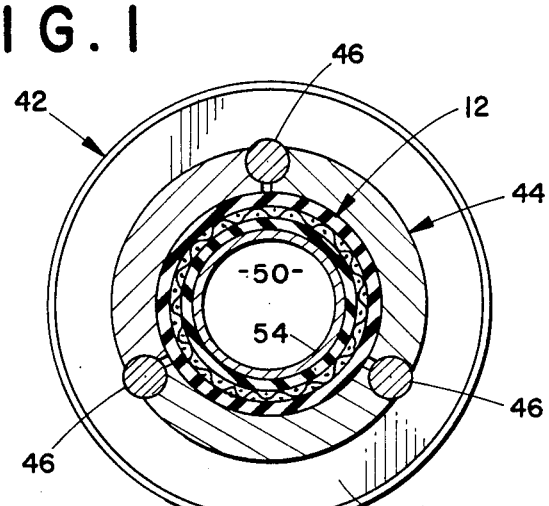
FIG. 3 is a view taken along line 3—3 in FIG. 1.
Figure 4:
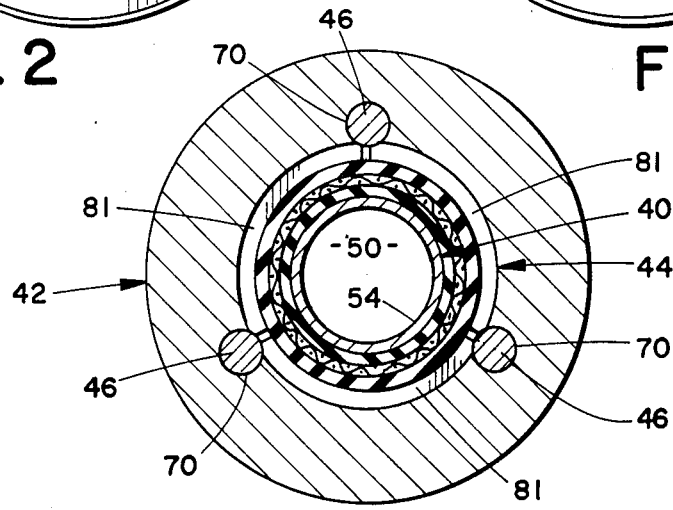
FIG. 4 is a view taken along line 4—4 in FIG. 1.

Referring to the drawings where the showings are for the purpose of illustrating the preferred embodiment only and not for limiting same, FIG. 1 shows a reusable hydraulic fitting 10 for fluidly coupling a multi-ply hose 12 to a flow line in a hydraulic accessory 14, illustrated in dashed lines. The hose 12 is fluidly connected at its other end to another hydraulic accessory, not shown. The hydraulic accessories may be any conventional devices interconnected for operation or control in response to fluid flow conditions in the flow line.

The hydraulic accessory 14 generally comprises a housing 20 having an internal fluid flow passage 22 outwardly terminating with a threaded bore 24. The accessory 14 has an outer wall 26 immediately adjacent the fitting 10. While illustrated as horizontal, the bore 24 may be otherwise oriented as required.

The hose 14 may be any commercially available type and as illustrated, comprises a multi-ply core 30 having an inner cylindrical surface 32 defining a fluid flow line 34, and an outer cylindrical surface 36. The core 30 is formed of a suitably compressible elastomeric material including inner and outer plies 37 and 38, respectively and an internal reinforcing ply 39 such as coiled wire or braided sheating.

The hose 14 may be provided with a lay line which extends longitudinally along the length thereof and provides visual indication of any twisting between the hydraulic accessories. With the present invention, the line is circumferentially identically aligned at both ends to avoid any torsional loading on the core which could, in a well known manner, adversely affect the operational strength thereof.

Referring additionally to FIGS. 2–6, the fitting 10 comprises an inner nipple 40, an outer socket 42, a segmented wedge 44 retained between the inner nipple 40 and the outer socket 42, and three threaded fasteners 46, preferably Allen head cap screws, axially threadedly connected between the nipple 40 and the socket 42.

The nipple 40 has a central axial flow passage 50 fluidly interconnecting the flow passage 34 of the hose 12 and the flow passage 22 of the hydraulic accessory 14. The nipple 40 further includes a male connector 52 at one end and an elongated nipple sleeve 54 at the other end which are axially spaced by an enlarged central hexagonal neck 56 having three equally spaced threaded holes 57. The connector 52 is provided with an external thread complementary to the thread on the bore 24 of the hydraulic accessory 14. Thus, by means of a suitable wrench applied to the neck 56, the nipple 40 may be tightly fluidly connected to the accessory 14, directly without the need for adapter fittings. The depth of threaded engagement is such that the axial face 58 of the neck 56 is closely adjacent to and may be almost flush with the housing wall 26. The nipple sleeve 54 is coextensive with the socket 42 and projects slightly axially therebeyond. The sleeve 54 has a cylindrical outer surface 56 having a sliding telescopic interference fit with the inner cylindrical surface 59 of the hose 12. The sleeve 54 additionally includes a chambered tip portion 60.

The outer socket 42 is annular and defined by a cylindrical outer surface 62, a conical inner surface 64 and annular axially spaced end surfaces 66 and 68. As previously mentioned, the length of the outer socket 42, as defined by the end surfaces 66 and 68, is substantially coextensive with the sleeve 54, although it will be appreciated that equal lengths are not essential. The conical surface 64 converges inwardly from the end face 66 to the end face 68 at a shallow angle in the order of about 3° to 15°, preferably about 5°, sufficient to establish the necessary compressive loading at the hose wall interface and to thereby maintain fluid integrity under operational fluid flow conditions.

Figure 5:
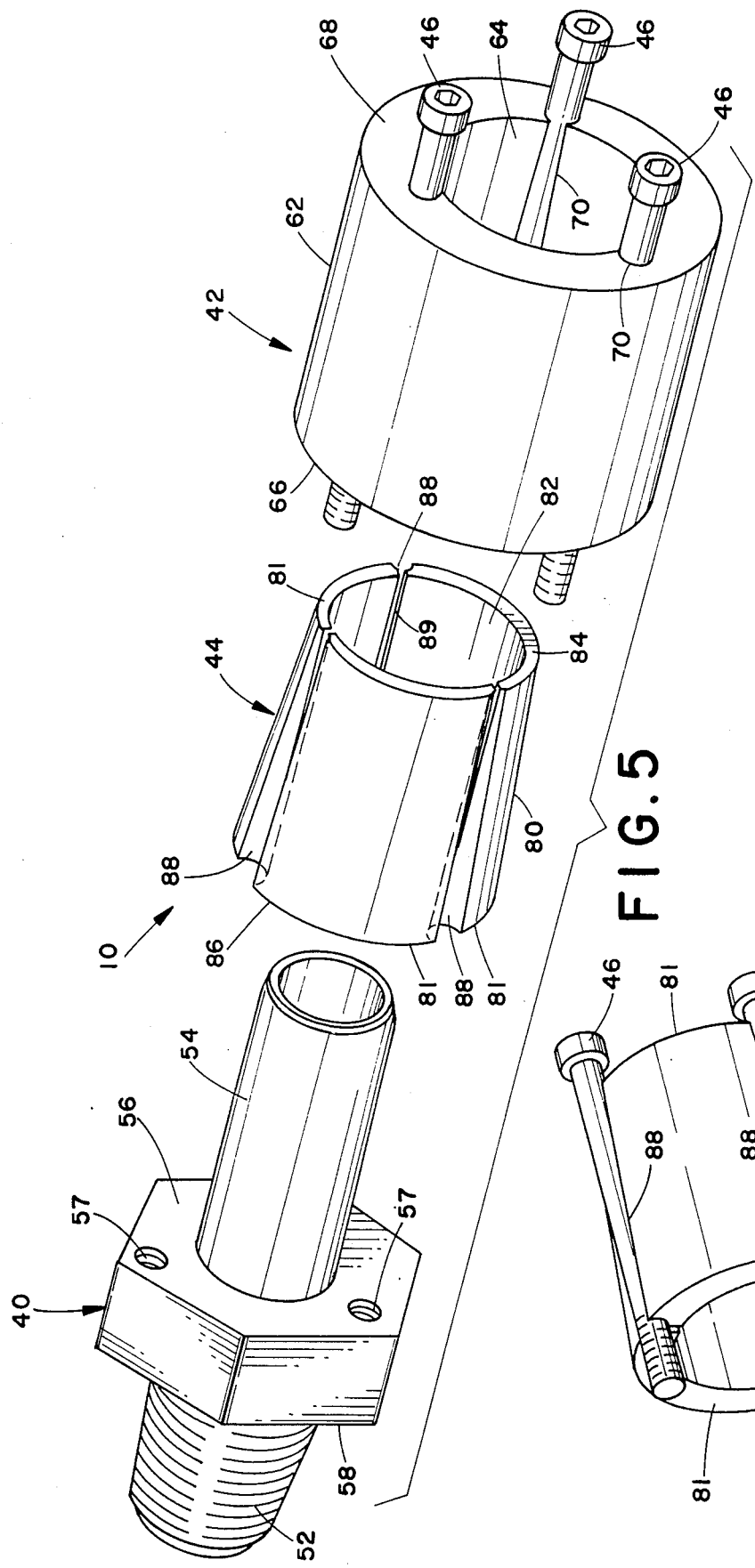
FIG. 5 is an exploded perspective view of the reusable hydraulic fitting.

The inner conical surface 64 is provided with three evenly circumferentially spaced cylindrical grooves 70, which extend parallel to the central axis of the outer socket 42. The grooves 70 have a pitch diameter lying between the outer cylindrical surface 62 and the inner edge of the end face 68. Accordingly, the grooves 70 have an increasing depth between the end faces 66 and 68. Adjacent the end face 68, the cylindrical walls of the grooves 70 circumscribe, an arc greater than 180° thereby defining a width less than the diameter of the fasteners 46, thereby capturing the latter in assembly as shown in FIG. 5.

The wedge 44 comprises three segments 81, each identically shaped and defined by an outer conical surface 80, an inner cylindrical surface 82 and axially spaced end faces 84 and 86. The conical surface 80 diverges toward the end face 86 and has an angle complementary to the inner conical surface 64 of the outer socket 42. The length of the segments 81 is preferably less than the length of the sleeve 54 such that the loading developed in assembly is borne entirely by the sleeve.

Figure 6:
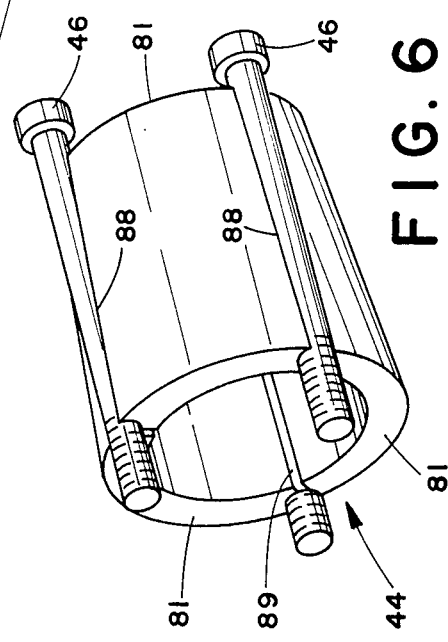
FIG. 6 is a perspective view of the segmented wedge and cap screws.

Three cylindrical grooves 88 are formed in the outer conical surface 80 of the wedge 44. The grooves 88 have a pitch diameter intermediate the outer rim of face 86 and the outer rim of face 84. Accordingly, the grooves 88 open radially outwardly and have an increasing depth from face 84 to face 86, with the portion adJacent face 86 spanning a sector greater than 180°, thus capturing the fasteners 46 as shown in FIG. 6. A radial gap 89 at the base of the grooves 88 circumferentially separates each segment 81. In addition to maintaining an even circumferential spacing, the fasteners 46 as mentioned, capture the segments 81 to limit radially inward movement of the wedge 44 at the groove-fastener interface while accommodating compressive engagement of the hose 12 as hereinafter described in greater detail. In this connection, it will be appreciated that the radial gaps 89 may be provided intermediate the grooves while retaining the aforementioned benefits. The grooves 70 and 88 have a clearance fit with the fasteners 46 sufficient to accommodate the inward compressive while providing the spacing and retention of the individual segments 81.

The inner cylindrical surface 82 of the wedge 44 has a diameter corresponding to a predetermined compression of the hose core 30 when the outer socket is substantially in the illustrated assembled position. In this connection, it has been determined that about 20% to 50% compression will establish a fluid tight interface between the hose 12 and the sleeve 54 under conventional operating conditions. In a similar fashion, the mean diameter of the conical surface 80 of the wedge 44 and the mean diameter of the conical surface 64 of the outer socket 42 are substantially aligned in the assembled position to preferably provide a uniform loading on the segments 81 and the hose 12 in the installed position, however, it will be appreciated that due to the inherent mechanical advantage of the fitting and segment deflection fluid integrity may be obtained for variations therefrom.

To establish a fluid line connection using the above described fitting, the threaded connector 52 is inserted into the threaded bore 24 of the accessory 14 and by means of a suitable tool, such as an open ended wrench, applied to the neck 56, the nipple 40 is rotated until the connector 52 is fully seated at the bore 24 in a fluidly sealed condition. The hose 12 is then extended to the fitting 10 with the lay line oriented without twisting of the hose to a similar circumferential orientation as indicated at the opposed end. The hose 12 is severed at a length corresponding to the outer face of the neck 56. The outer socket fastener-wedge sub-assembly is then telescopically inserted rearwardly over the terminal end of the hose 12. The hose 12 is then inserted over the sleeve 54 into engagement with the outer face of the neck 56 and circumferentially oriented to the prescribed circumferential orientation. Thereafter the outer sub-assembly is advanced toward the neck 56 and loosely aligned such that the projecting ends of the fasteners 46 are aligned with the threaded holes 57 in the neck 56. The fasteners 46 are then sequentially tightened to a predetermined instrument or manually determined torque or until the outer socket 42 is shifted from the loosely coupled relation to a fully tightened position shown in FIG. 1 wherein the socket 42 engages the neck 56 and the core 30 is suitably compressed between the segments 81 and the seleve 54. During this installation, the fasteners 46 will maintain and prescribe the evenly spaced orientation of the segments 81 to ensure uniform loading on the hose 12 and the sleeve 54 to prevent any ovalling at the interface which could establish axially directed low compression interfaces leading to a loss of operational fluid integrity.

In the event of hose failure or other conditions requiring fitting removal, the above steps are reversed. After unseating of the fasteners 46, the outer socket 42 is retracted. Because of the compressive set in the hose 12, the segments 81 will ordinarily remain in place. The individual segments 81 may be pried loose with a suitable tool and reused along with the other components of the fitting. Thereafter, the hose may be removed from the sleeve by pulling, severing or the like. A new hose may then be readily installed as described above reusing the in-place nipple, together with associated outer components.

Having thus described the invention, it is claimed:

1. A hydraulic fitting for fluidly connecting a fluid accessory with a compressible hose member comprising: a nipple member fluidly connectable with the fluid accessory, said nipple member having an elongated sleeve portion, an enlarged neck portion and a flow passage extending therethrough, said hose member being receivable over said sleeve portion; segment means comprising a plurality of circumferentially spaced wedge members having an inner surface engagable with the outer surface of the hose member and a conical outer surface and diverging toward said neck portion; a socket member having a conical inner surface diverging away from said neck portion, said conical inner surface being engagable with said conical outer surface of said segment means and complementary thereto; fastener means operatively connected between said socket member and said neck portion for axially moving said socket member toward said neck portion and for radially inwardly moving said segment means toward said sleeve portion to thereby fixedly compress the hose member therebetween in assembly; means including said fastener means operative between said socket member, said neck portion and said segment means for circumferentially spacing said wedge members and for limiting radially inward movement of said wedge members relative to said socket member.

2. The hydraulic fitting as recited in claim 1 wherein said fastener means include: a plurality of threaded passages in said socket member axially alignable with complementary passages in said socket member; a plurality of fasteners having shank portions extending through said passages and threaded portions threadedly engageable with said threaded holes; and cylindrical surfaces formed on the axial side surfaces of said wedge members and engageable with said shank portions of said fastener means for circumferentially spacing said wedge members and for establishing radially outwardly extending slots therebetween narrower than said shank portions thereby limiting radially inward movement of said segment means relative to said socket member.

3. The fluid fitting as recited in claim 2 wherein said passages in said socket member include partially radially inwardly opening passages therein and said cylindrical surfaces on said segment means include cylindrical grooves on the sides of said wedge members defining an axial slot therebetween less than the diameter of said shank portions of said fasteners whereby said fasteners circumferentially orient said wedge members relative to said socket member and limit radial movement therebetween.

4. The hydraulic fitting as recited in claim 2 wherein said fasteners consist of a plurality of Allen head bolts having head portions overlying the axially surface of said socket member remote from said neck portion of said nipple member.

5. The hydraulic fitting as recited in claim 4 wherein said nipple member includes an integrally formed, exteriorly threaded portion axially spaced from said sleeve portion by said neck portion and threadedly connectable to the fluid accessory.

* * * * *